United States Patent Office 3,264,919
Patented August 9, 1966

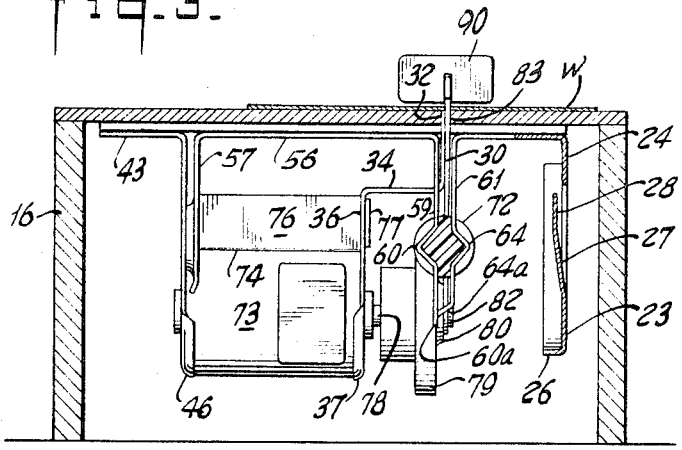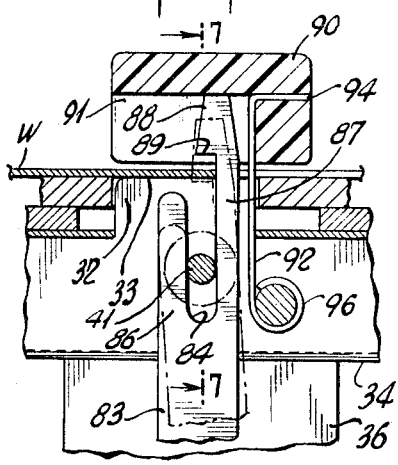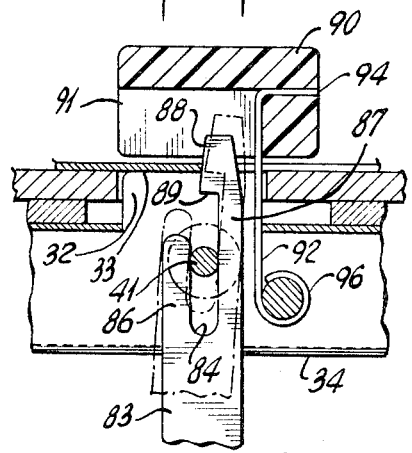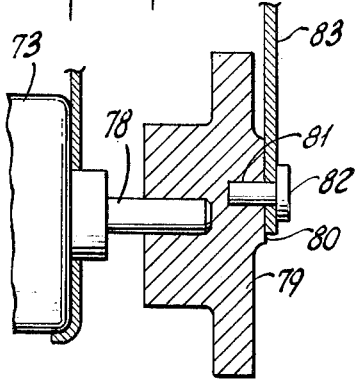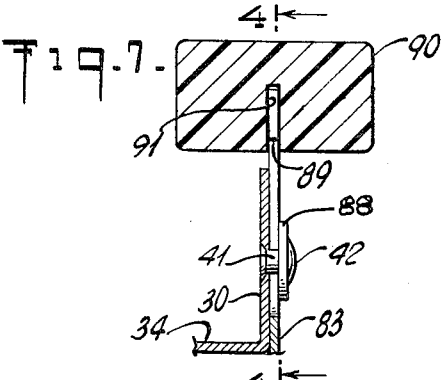

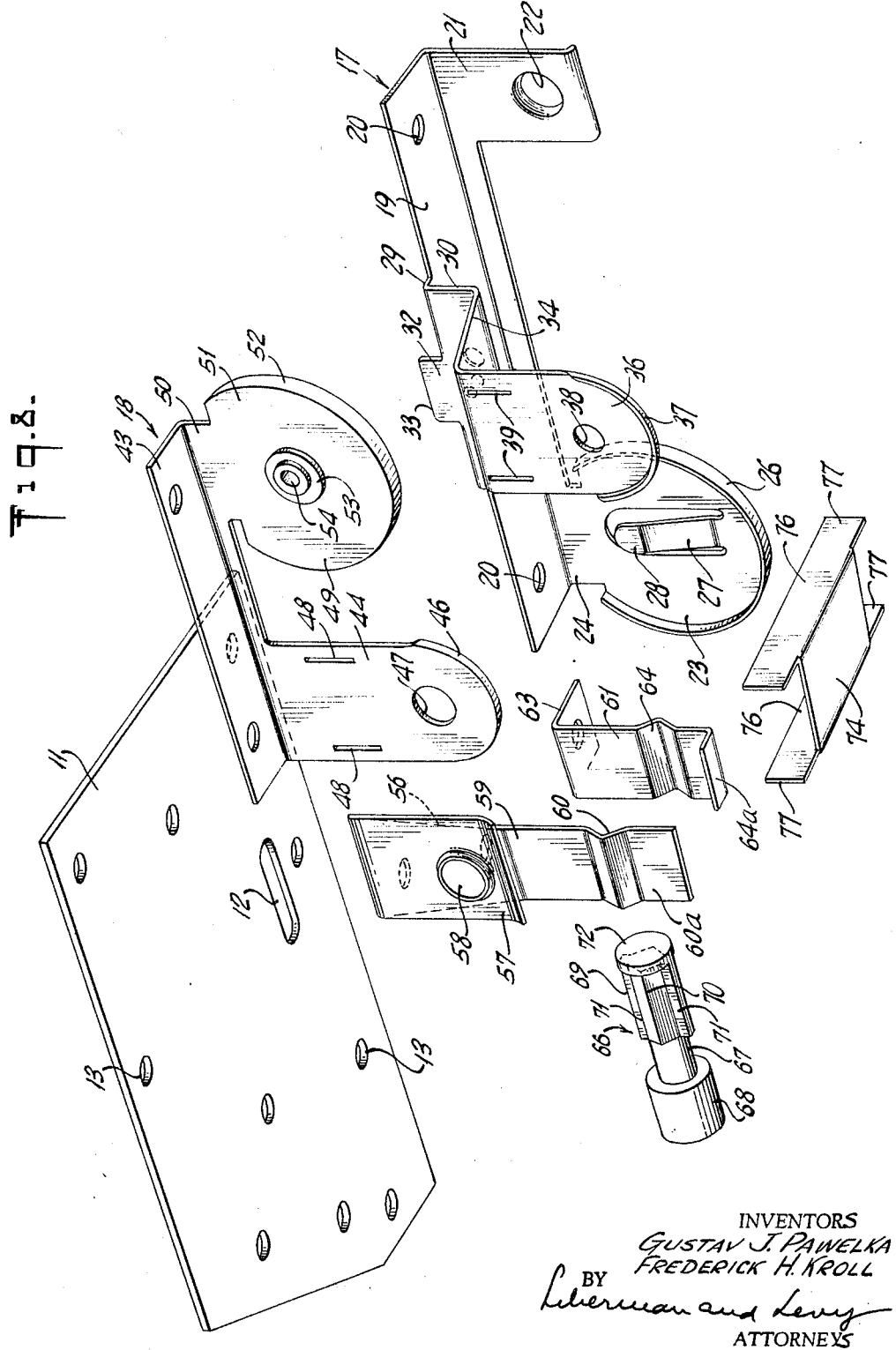

3,264,919
SNIPPING DEVICE
Gustav J. Pawelka, Sunset Ave., Glenwood Landing, N.Y., and Frederick H. Kroll, 72 Wood Hollow Lane, New Rochelle, N.Y.
Filed Aug. 31, 1964, Ser. No. 393,325
8 Claims. (Cl. 83—237)

The present invention relates generally to improvements in cutting devices and it relates, in particular, to an improved self-contained, motor driven web cutting apparatus.

Many occasions occur both commercially and domestically when it is desired to cut or trim a small web such as of paper, cardboard, plastic or the like along straight, curved or sinuous lines. While ordinary scissors may be employed for this purpose, they possess numerous drawbacks and disadvantages. Their use is time-consuming and requires some degree of skill, particularly in the cutting of lines smoothly traversing a complex path. In addition, a sharp scissors is a hazardous implement in the hands of a child while a dull scissors is difficult to cut with and thus inefficient to employ. Although many types of web cutting and trimming devices have been proposed and available, these were generally complex and expensive devices and left much to be desired.

It is thus a principle object of the present invention to provide an improved cutting device.

Another object of the present invention is to provide an improved apparatus for cutting webs smoothly along straight, curved and sinuous lines.

Still another object of the present invention is to provide a compact, self contained, motorized web cutting apparatus.

A further object of the present invention is to provide a compact, motorized web cutting device in which the cutting elements are shielded and which thus are safe to use.

Still a further object of the present invention is to provide a web cutting apparatus of the above nature characterized by its simplicity, ruggedness, versatility and low cost.

The above and other objects of the present invention will become apparent from a reading of the following description, taken in conjunction with the accompanying drawings, wherein FIGURE 1 is a longitudinal vertical sectional view of an improved cutting apparatus embodying the present apparatus and taken along line 1—1 in FIGURE 2;

FIGURE 3 is a sectional view taken along line 3—3 in FIGURE 2;

FIGURE 4 is an enlarged fragmentary sectional view taken along lines 4—4 in FIGURES 2 and 7, the oscillating blade being shown by full line in a fully raised position and by broken line in a partially depressed position;

FIGURE 5 is a view similar to FIGURE 4, the oscillating blade being shown by full and broken lines in different positions of its stroke;

FIGURE 6 is a sectional view taken along line 6—6 in FIGURE 1;

FIGURE 7 is a sectional view taken along line 7—7 in FIGURE 4; and

FIGURE 8 is a bottom perspective exploded view of the support plate, motor bracket and battery bracket and switch assembly.

Figure 1:
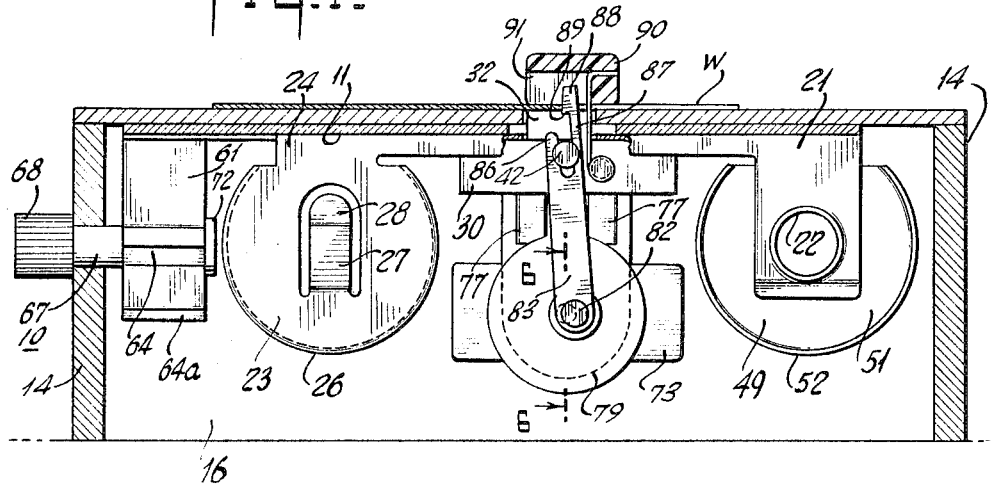
Figure 2:
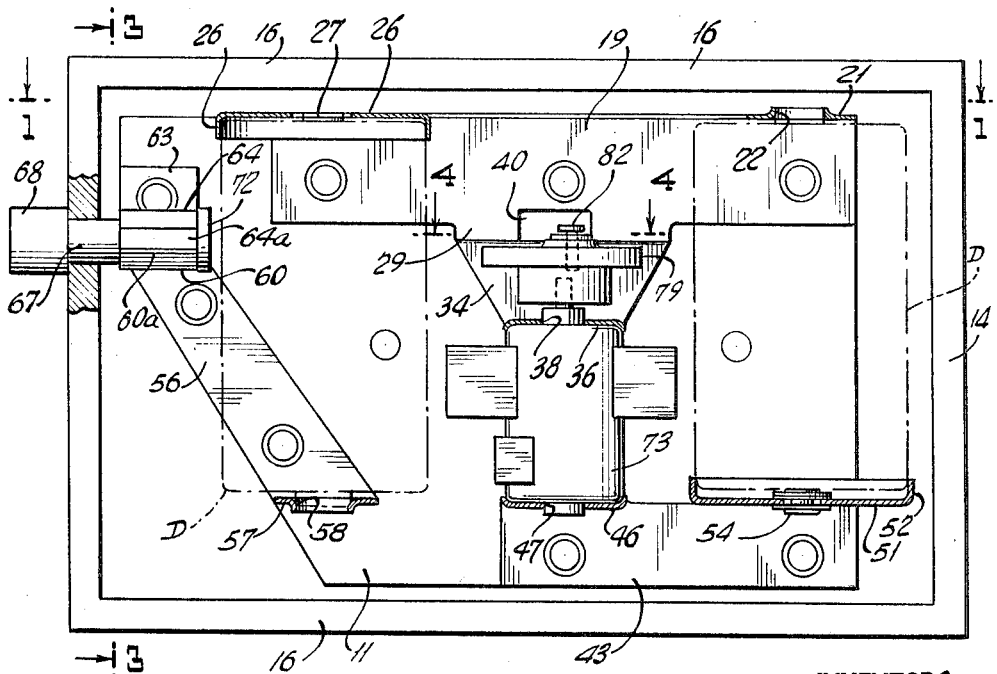
FIGURE 2 is a bottom plan view thereof.

In a sense, the present invention contemplates the provision of a web cutting apparatus comprising a plate having an opening formed therein, a stationary shear plate registering with said opening and provided with a shear edge, a blade member mounted for rocking movement about a horizontal axis and sliding movement in a vertical plane and provided at its upper end with a forwardly directed cutting element having a downwardly directed blade edge movable with said blade along a path vertically across said shear edge, and a drive motor connected to said blade and rocking said blade about said horizontal axis and reciprocating said blade relative to said shear edge. The cutting blade is guarded by an overlying button, the underface of which is spaced slightly above the plane of the plate so as to provide a narrow passageway for the material being acted upon, maintaining same in position close to the plate.

According to a preferred form of the present apparatus, the plate functions as a guide plate and as a mounting plate and is formed of an insulating material and is suitably horizontally supported. Depending from and affixed to the underside of the mounting plate are a pair of transversely spaced bracket members, one of the bracket members including longitudinally spaced, vertical end first and second bracket arms and an intermediate first motor bracket arm, and the other bracket member including longitudinally spaced vertical motor and battery bracket arms transversely aligned with the first motor bracket arm and the first battery bracket arm respectively. Another metal bracket member is affixed to the underface of the mounting plate and includes a battery bracket arm transversely aligned with the second battery bracket arm and a dependent resilient switch arm. A second resilient switch arm depends from the mounting plate and normally engages the first switch arm, a manipulatable non-round spindle of insulating material being positioned between the switch arms and rotatable selectively to separate the switch arms and to release them into engagement. An electric motor is supported by the motor bracket arms, and batteries are supported by the battery bracket arms, the motor being connected in series with the switch arms across the batteries. The shear plate is axially offset relative to the motor and carries a transverse pivot pin below the shear edge. The blade abuts the shear plate and has a longitudinal slot which slidably engages the pivot pin, and a fly wheel is affixed to the motor shaft and carries an eccentric crank pin which is connected to the lower end of the blade. A guide member is supported a short distance above the mounting plate by a wire projecting upwardly through the mounting plate opening, forward of and coplanar with the blade and is provided with a longitudinal slot engaging the blade.

Referring now to the drawings which illustrate one form of device constructed according to and embodying the present invention, reference numeral 10 generally designates the improved web cutting apparatus which includes a horizontal base plate 11 which functions both as a table and a mounting plate and is formed of any suitable insulating material, for example, vulcanized fiber board or the like. Formed in base plate 11 adjacent a border thereof and forwardly longitudinally offset is a short longitudinally extending slot 12 and also located in base plate 11 are a plurality of mounting holes 13. Base plate 11 is suitably mounted atop vertical end walls 14 and vertical side walls 16 which may be suitably secured and formed of wood, plastic or other desirable material.

Depending from and affixed to the underface of base plate 11 are a pair of first and second resilient metal bracket members 17 and 18 respectively. The first bracket member 17 includes a longitudinally extending top plate 19 abutting the underface of base plate 11 between opening 12 and the adjacent side edge of base plate 11 and secured thereto by grommets or other fasteners registering with openings 20 formed in the bracket plate 19 and with openings 13. A first battery bracket arm 21 depends from the leading outer edge of bracket plate 19 and has a cylindrical well 22 formed in its lower inner face and adapted to engage the mating positive terminal of a flashlight battery. A second battery bracket arm 23 depends from the trailing outer edge of the bracket plate 19 and is of substantially circular configuration and of about the diameter of that of a flashlight battery, being joined to bracket plate 19 by a short intermediate leg 24. Formed along the lower and side perimeter of bracket arm 23 is an inwardly directed peripheral flange 26. Disposed along the inner face of and integrally formed with arm 23 is an inwardly upwardly inclined leaf spring member or finger 27 terminating in a contact defining angulated ear 28.

Projecting inwardly from the bracket plate 19, intermediate its ends and coplanar therewith, is a short horizontal leg 29 which extends to about the inner edge of slot 12 and terminates in a downwardly directed vertical panel 30. Panel 30 is provided along its medial top edge with an integrally formed, coplanar vertical rectangular tongue 32 which projects through opening 12 to terminate in a longitudinally extending shear edge 33 substantially at the level of the top face of the base plate 11, panel 30 and tongue 32 defining a stationary shear plate. A horizontal trapezoidal plate 34 projects inwardly from the lower edge of panel 30 and terminates in a depending vertical first motor bracket arm 36 having an arcuate bottom edge provided with an inwardly directed peripheral flange 37. Formed in motor bracket arm 36, concentric with the flange 37, is a bushing and shaft opening 38 and a pair of transversely spaced vertical slots 39 are formed in the upper section of arm 36 adjacent respective side edges thereof. A rectangular opening 40 is formed in bracket plate 19 and leg 29 adjacent shear plate 30 and in registry with base plate opening 12. A transverse pivot pin 41 is affixed to and medially located on shear plate 30 shortly below tongue section 32 and is outwardly directed therefrom and terminates in an enlarged head 42.

The second bracket member 18 comprises a longitudinal top plate 43 abutting the underface of base plate 11 along the side edge thereof opposite bracket plate 19 and affixed thereto by fasteners registering with openings in plate 43 and corresponding openings 13. Depending from the trailing inner edge of the bracket plate 43 is a second motor bracket arm 44 confronting and in transverse alignment with the first motor bracket arm 36. The lower edge of bracket arm 44 is arcuate and is provided with an inwardly directed peripheral flange 46 matching the flange 37. Formed in the bracket arm 44 is a circular opening 47 concentric with flange 46; also a pair of vertical slits 48 along the opposite edges of the arm 44, opening 47 and slits 48 being in transverse alignment with opening 38 and slits 39 respectively.

A third battery bracket arm 49 depends from the inner leading edge of bracket plate 43 in transverse alignment with the first battery bracket arm 21 and includes a short upper section 50 and a substantially circular lower section 51 having an inwardly directed peripheral flange 52 and a concentric opening. A pair of insulator washers 53 registers with the concentric opening and abuts opposite faces of bracket arm 49, and a contact defining grommet 54 engages and secures washers 53 and is insulated from bracket arm 49.

An oblique metal band 56 is affixed to the rear underface of base plate 11 and terminates at one end thereof in a depending fourth resilient battery bracket arm 57 in transverse alignment with the second battery bracket arm 23. A cylindrical well 58 is formed in the inner face of bracket arm 57 coaxial with second bracket arm 23 and of a size to engage the positive terminal of a flashlight battery. Depending from the opposite end of band 56 is a resilient metal switch arm 59 shaped adjacent its lower end to form a transverse inwardly facing V-shaped channel 60 terminating in a depending leg 60a. Cooperating with the switch arm 59 is a confronting resilient vertical switch arm 61 having a horizontal ear 63 at its upper end affixed to the underface of base plate 11. A transverse V-shaped channel 64 is formed in switch arm 61 in confronting registry with the channel 60. The switch arm 61 terminates at its bottom in a flange 64a extending slightly downwardly from the horizontal normally resiliently the confronting face of the switch arm bottom leg 60a.

In order to effect the opening and closing of the switch defined by switch arms 59 and 61, there is provided a control spindle 66 formed of insulating material and journalled in an end wall 14 and registering with the switch arm channels 60 and 64. The spindle 66 includes a cylindrical section 67 engaging a corresponding bore in the end wall 14 and terminating along the outer face of the end wall 14 in a knob 68. Projecting forwardly from cylindrical section 67 is a coaxial control section 69 extending between the switch arms 59 and 61 along the passageway delineated by the channels 60 and 64. Control section 69 includes a pair of diametrically opposite low longitudinal ridges 70 corresponding in shape to the channels 60 and 64 and a pair of diametrically opposed high longitudinal ridges 71 circumferentially spaced 90° from ridges 70. When spindle 66 is turned to a position with the low ridges 70 engaging channels 60 and 64, switch arms 59 and 61 are released to their normally closed position with flange 64a engaging the switch leg 60a, and when spindle 66 is turned to a position with the high ridges 71 engaging the channels 60 and 64 the switch arms 59 and 61 are spread to their open positions with the leg 60a and flange 64a separated. Control section 69 terminates at its free end in an enlarged circular head 72.

A direct current, preferably permanent magnet, electric motor 73 is supported by and between the motor bracket arms 36 and 44 and has peripheral end borders resting on the flanges 37 and 46. Motor 73 is locked in position by a transverse plate 74 engaging the upper face of motor 73 and provided along its side edges with upstanding flanges 76 projecting, as tongues 77, beyond the ends of the plate 74 and through corresponding slits 39 and 48. Tongues 77 are upset along the outer faces of the motor bracket arms 36 and 44. Motor 73 is provided with end bushings registering with the motor bracket arm openings 38 and 47 and a drive shaft 78 which projects beyond motor bracket arm 36. Battery cells D of the flashlight type are engaged by corresponding pairs of battery bracket arms 21, 49 and 23, 57, the positive terminals thereof being engaged by the wells 22 and 58 and the negative walls by the contact 54 and the finger 27. One terminal of motor 73 is connected to switch arm 61 and the other terminal to contact 54 to complete the energizing circuit to motor 73.

A fly wheel 79 of any suitable material is affixed to the free end of shaft 78 and is rotatable therewith. The outer face of the fly wheel 79 is provided with an outwardly projecting hub section 80 of small area on which is mounted an outwardly directed crank pin 81, eccentric to drive shaft 78 and terminating in an enlarged head 82.

An elongated vertically extending oscillating and reciprocating flat blade 83 lies in a longitudinal vertical plane and abuts the outer face of shear plates 30 and 32 projects through opening 12 above shear edge 33. The upper section of the blade 83 has a longitudinal slot 84 formed therein which rockably and slidably engages pin 41 and is delineated by a short front leg 86 and a long front leg 87 projecting above front leg 86 and separated therefrom by an upper opening. A washer 88 is entrapped between the confronting faces of blade 83 and pivot head 42. The lower end of blade 83 is directly connected to crank pin 81 which oscillates and reciprocates the blade 83 with the rotation of the motor shaft 78 and is maintained thereon by head 82. It should be noted that motor shaft 78 is rotated in a clockwise direction, as viewed in FIGURES 1, 4 and 5 of the drawings.

Directed forwardly from and formed integrally with the upper end of blade leg 87 is a flat coplanar cutting element 88 having a downwardly facing substantially horizontal cutting edge 89 which is disposed above the upper end of the blade leg 86 approximately the distance of the vertical stroke of crank pin 81 and blade 83. A guide button 90, formed of plastic or other suitable material, is positioned directly above base plate 11 in registry with opening 12. Button 90 has a flat bottom face parallel to and spaced shortly above the top face of base plate 11, to delineate therewith a web guide passageway. A narrow longitudinally extending slot 91 is formed in the trailing underface of button 90 and engages and guides the cutting element 88, restricting it to a free vertical and longitudinal movement along the plane of the shear plate. Button 90 is supported by a vertical wire element 92 lying in the plane of blade 83. Wire 92 terminates at its top in a rearwardly directed leg 94 which is imbedded in a corresponding bore formed in the leading section of button 90, and is provided at its bottom with a coupling loop 96 which is suitably affixed to the outer face of plate 30. It is to be noted that the vertical stroke of blade 83 reciprocates cutting element 88 between an upper position directly below the top of slot 91 and a lower position, with shear edge 33 approximately midway between the top of the cutting element 88 and the cutting edge 89.

In operation, switch arms 59 and 61 are closed by turning the spindle 66 to a switch-close position, as earlier described, to energize motor 73 and rotate shaft 78 and fly wheel 79. A web W, which is to be cut, is fed toward blade 83 and guided between button 90 and base plate 11 along a path in accordance with the shape of the cut desired. When crank pin 81 and the blade 83 are at the top of their stroke there is left a forwardly opening space between shear edge 33 and cutting edge 89 into which the uncut section of web W is fed (see FIG. 4). As the crank pin traverses its downward stroke it swings cutting element 88 forwardly and downwardly to snip and effect a small cut of the web W and thence continues to the bottom of its stroke, lowering cutting element 88 to its bottom position and rearward medial longitudinal position. Thereafter, crank pin 81 and blade 83 traverse their upward stroke, raising the cutting element and thence moving it forwardly during the upper half of its upward stroke. Thus, as the cutting edge 89 moves downwardly along the shear edge 33 it is in its foremost position toward the leading part of web W, and as it moves upwardly along the shear edge 33 it is in its rearwardmost position. The oscillation and reciprocation of the blade 83 is very rapid, passing through an oval path, and a neat, sharp, small cut is effected during each stroke so that a rapid cutting along any desired path can be rapidly accomplished. As a result of the cutting being effected while the cutting edge of the blade is moving slightly rearwardly, the web is pulled in a rearward direction, thus providing somewhat a self-feeding action.

While there has been described and illustrated a preferred embodiment of the present invention it is apparent that numerous alterations, omissions and additions may be made without departing from the spirit thereof as set forth in the annexed claims.

What is claimed is:

1. A web cutting apparatus comprising a horizontal guide plate having an opening formed therein, a shear plate registering with said opening and provided with a shear edge substantially at the level of the upper face of said guide plate and a substantially vertical face depending from said shear edge, a blade member mounted for rocking movement about a horizontal axis substantially perpendicular to said vertical face and sliding movement along said vertical face and provided at its upper end with a forwardly directed cutting element having a downwardly directed blade edge movable with said blade along a path vertically across said shear edge, a guide member positioned a short distance above said guide plate and overlying said opening, said guide member having a longitudinal slot formed in the underface thereof slidably engaging the upper end of said blade, and a drive motor connected to said blade and rocking said blade about said horizontal axis and reciprocating said blade relative to said shear edge.

2. The cutting apparatus of claim 1, including a support element projecting above said guide plate and supporting said guide member and lying in the plane of and not substantially exceeding the thickness of said blade.

3. The cutting apparatus of claim 1, comprising a stationary horizontal pivot pin, said blade having a longitudinal slot engaging said pivot pin, and means limiting the movement of said blade axially along said pivot pin.

4. The cutting apparatus of claim 3, including a crank pin eccentrically mounted on said motor and connected to the lower end of said blade.

5. A web cutting apparatus comprising a horizontal support plate formed of an electrical insulating material and having a longitudinal slot formed therein, a first metal bracket member mounted on the underface of said support plate and including a longitudinally-spaced first depending motor bracket arm and a first depending battery bracket arm and an upwardly directed vertical longitudinal shear plate registering with said support plate opening and terminating at about the level of the top face of said support plate, a second bracket member mounted on the underface of said support plate and including a second depending motor bracket arm parallel to and in transverse spaced alignment with said first motor bracket arm and a second depending battery bracket arm parallel to and in transverse spaced alignment with said first battery bracket arm, a horizontal transverse pivot pin mounted on said shear plate below the upper edge thereof, an elongated blade abutting a vertical face of said shear plate and having a longitudinal slot engaging said pivot pin and terminating at its upper end in a forwardly directed cutting element having a downwardly facing cutting edge, an electric motor supported by and between said motor bracket arms and including a drive shaft, a crank pin eccentrically mounted on said drive shaft and connected to the lower end of said blade, a battery supported by and between said battery bracket arms, and means including a switch connecting said battery to said motor.

6. The web cutting apparatus of claim 5, comprising a wire element affixed to and projecting upwardly from said shear plate through said support plate opening and forwardly of and coplanar with said blade, and a guide member mounted atop said wire element and having a longitudinal slot on its underface registering with said cutting element.

7. The web cutting apparatus of claim 5, wherein said switch comprises a pair of spaced parallel confronting resilient metal arms affixed to and depending from the underface of said support plate and normally urged into contacting engagement, and a spindle of insulating material and of non-round cross section disposed between said switch arm and selectively rotatable between a switch arm engaging and a switch arm disengaging position.

8. The web cutting apparatus of claim 5, including a fly wheel mounted on said motor shaft, said crank pin being mounted on said fly wheel.

References Cited by the Examiner

UNITED STATES PATENTS

| | | | |
|---|---|---|---|
| 1,342,008 | 6/1920 | Weis | 83—647.5 |
| 1,582,052 | 4/1926 | Klages | 83—49 |
| 1,842,229 | 1/1932 | Achard | 83—647.5 |
| 2,575,417 | 11/1951 | Heyman | 83—647.5 X |
| 2,610,685 | 9/1952 | Bron et al. | 83—916 X |

WILLIAM S. LAWSON, Primary Examiner.

WILLIAM W. DYER, JR., Examiner.

F. T. YOST, Assistant Examiner.